Patented Sept. 25, 1923.

1,468,805

UNITED STATES PATENT OFFICE.

MARTIN FREUND, DECEASED, LATE OF FRANKFORT-ON-THE-MAIN, GERMANY; BY WALTER FREUND, ADMINISTRATOR, OF FRANKFORT-ON-THE-MAIN, GERMANY, AND EDMUND SPEYER, OF FRANKFORT-ON-THE-MAIN, GERMANY.

ISOMERIC PRODUCT OF REDUCTION OF OXYCODEINON AND PROCESS OF PREPARING THE SAME.

No Drawing.    Application filed July 15, 1921.   Serial No. 485,130.

*To all whom it may concern:*

Be it known that MARTIN FREUND, deceased, formerly a resident of Frankfort-on-the-Main, for whom the undersigned WALTER FREUND, residing at Frankfort-on-the-Main, citizen of the German Republic, is the legalized administrator of estate, and I, EDMUND SPEYER, a resident of Frankfort-on-the-Main, citizen of the German Republic, have invented certain new and useful Improvements in Isomeric Products of Reduction of Oxycodeinon and Processes of Preparing the Same (for which we have filed applications in Germany, April 14, 1916, Patent No. 296,916; Austria, filed December 9, 1916, Patent No. 75,740; Hungary, filed December 9, 1916, Patent No. 71,587; Switzerland, filed December 7, 1916, Patents Nos. 75,110 and 75,625 and 76,049; Spain, filed August 18, 1920, Patent No. 72,708; Czechoslovakia, filed February 10, 1920, Patent No. 2,228; Norway, filed December 30, 1919, Patent No. 31,350; Italy, filed February 23, 1920, Serial No. 283/44; Netherlands, filed December 31, 1919, Serial Nos. 16,685, 15,089, and 15,090; Denmark, filed December 29, 1919, Serial Nos. 3,498/19, 2,265/19 and 2,266/19; and Sweden, filed January 20, 1920, Serial No. 164/20), of which the following is a clear, full, and exact description.

The subject of this invention is dihydrooxycodeinon, an unknown derivative of oxycodeinon—a product described in the German Letters Patent No. 286,431—and the process for preparing the same.

Oxycodeinon of the formula $C_{18}H_{19}NO_4$ and having a melting point of 275° C. by reduction is converted into dihydrooxycodeinon of the formula $C_{18}H_{21}NO_4$; the reduction being brought about by treating oxycodeinon with molecular hydrogen in acetate solution in the presence of a catalyzator of the platinum group, viz, a finely distributed metal of the platinum group or a colloidal solution of these metals.

Dihydrooxycodeinon produced in such manner crystallizes from alcohol in long jagged columns melting at 222° C. and yields well crystallized salts. Its hydrochloride $C_{18}H_{21}NO_4HCl$ crystallizes from water or diluted alcohol in columns melting at 268 to 270° C. Its free base is precipitated from solutions of its salts by ammonia, soda or alkalies; it is insoluble in excess of alkalies. It combines with methyl iodide to form $C_{18}H_{21}NO_4.CH_3J$, representing prisms decomposing at 251° C. Its ketone character is shown by the formation of an oxime, the hydrochloride of which: $C_{18}H_{22}N_2O_4.HCl$ is isolated in small sticks decomposing at 275 to 278° C.

The new dihydrooxycodeinon is to be used in medicine and pharmacy.

*Examples.*

1a. 10 grms. oxycodeinon are dissolved in diluted acetic acid. After adding a little platinum black and water to make up 100 c. c., the solution is shaken with hydrogen gas; after about 4 hours absorption has taken place conforming to one molecule of hydrogen. Separating the platinum by filtration, the acetic acid solution, being oversaturated with ammonia, quantitatively yields the hydrated base, which, recrystallized from alcohol, melts at 222° C.

1b. The reaction takes the same course upon adding to 10 grms. oxycodeinon, suspended in water, 32 c. c. normal acetic acid and agitating the solution obtained in such manner with hydrogen gas, while adding 0.05 grms. commercial colloidal palladium. No further hydrogen being absorbed, the palladium is separated in amorphous flakes by heating shortly. Upon supersaturating the filtered solution with ammonia, dihydrooxycodeinon is precipitated.

The base possesses the following additional properties; it is readily soluble in alcohol or chloroform, but with great difficulty soluble in ether or water.

Having thus described the invention, what is claimed is:—

1. The process of preparing dihydrooxycodeinon, melting at 222° C., which consists in reducing oxycodeinon in an acetic acid solution by molecular hydrogen in the presence of a metal catalyst of the platinum group.

2. The process of preparing dihydrooxycodeinon, melting at 222° C., which consists in reducing oxycodeinon in an acetic acid solution by molecular hydrogen in the presence of a finely distributed metal of the platinum group.

3. The process of preparing dihydrooxycodeinon, melting at 222° C., which consists in reducing oxycodeinon in an acetic acid solution by molecular hydrogen in the presence of a colloidal solution of a metal of the platinum group.

In testimony whereof we have hereunto signed our names in the presence of the two subscribing witnesses.

WALTER FREUND,
*Administrator of Martin Freund, deceased.*

Privatdgent Dr. EDMUND SPEYER.

Witnesses:
 PROFESSOR N. F. NAGLE,
 Dr. F. HAHN.